US 8,805,588 B2

(12) United States Patent
D'Angelo et al.

(10) Patent No.: US 8,805,588 B2
(45) Date of Patent: Aug. 12, 2014

(54) METHOD AND SYSTEM FOR CONTROLLING ELECTRICAL MACHINES

(75) Inventors: Giuseppe D'Angelo, Tufino (IT); Fabio Marchio', Sedriano (IT); Giovanni Moselli, Sant' Arpino (IT); Andre Roger, Munich (DE)

(73) Assignees: STMicroelectronics (Grenoble 2) SAS, Grenoble (FR); STMicroelectronics S.r.l., Agrate Brianza (MB) (IT)

( * ) Notice: Subject to any disclaimer, the term of this patent is extended or adjusted under 35 U.S.C. 154(b) by 300 days.

(21) Appl. No.: 12/977,098

(22) Filed: Dec. 23, 2010

(65) Prior Publication Data

US 2011/0160912 A1 Jun. 30, 2011

(30) Foreign Application Priority Data

Dec. 30, 2009 (EP) ..................................... 09368054

(51) Int. Cl.
*G05B 13/00* (2006.01)
(52) U.S. Cl.
USPC ............................ 700/275; 708/605; 318/490
(58) Field of Classification Search
USPC ............................ 708/605; 318/490; 700/275
See application file for complete search history.

(56) References Cited

U.S. PATENT DOCUMENTS

| 2002/0052905 | A1 | 5/2002 | Naik | |
| 2002/0178912 | A1* | 12/2002 | Munari et al. | 95/87 |
| 2003/0028574 | A1* | 2/2003 | Takagi | 708/605 |
| 2003/0094914 | A1* | 5/2003 | Yanagita et al. | 318/560 |
| 2004/0002862 | A1* | 1/2004 | Kim et al. | 704/249 |
| 2006/0129623 | A1* | 6/2006 | Uesugi | 708/490 |
| 2007/0027946 | A1* | 2/2007 | Visalli et al. | 708/700 |
| 2009/0238360 | A1* | 9/2009 | Ciet et al. | 380/28 |

FOREIGN PATENT DOCUMENTS

WO 9737299 10/1997

OTHER PUBLICATIONS

Wilco Dijkstra, posted on comp.sys.arm Jun. 20, 1996, comp.sys. arm, Google Gruppi, https://groups.google.com/group/comp.sys. arm/tree/browse_frm/thread/13e158b153c, pp. 2.
W:\2100 -\2110 STMicroelectronics S.r.l.—Europe\365 (I09072-US)\03\Wilco Dijkstra, posted on comp.sys.arm Jun. 20, 1996.htm.
Ken Turkowski, "Fixed Point Square Roof", Oct. 3, 1994, Apple Technical Report No. 96, pp. 3.

(Continued)

*Primary Examiner* — Mohammad Ali
*Assistant Examiner* — Anthony Whittington
(74) *Attorney, Agent, or Firm* — Graybeal Jackson LLP

(57) ABSTRACT

An embodiment is a method, and related system, to implement the square root extraction operation, which grants a 32 bits precision, which has high execution speed and is able to process a decimal radicand. An embodiment relates to a method for controlling an electric machine, comprising the detection of the value of at least one electrical quantity characterizing the machine operation and processing the detected value of said electrical quantity. The control method controls the machine operation on the basis of this processing. In particular the processing of the detected value of the electrical quantity comprises calculating a square root of a radicand value related to the detected value of electrical quantities. The calculation of the square root includes: calculating an approximated value of the square root, having a first precision, and then calculating a corrective value and combining said approximated value with said corrective value to obtain a square root value having a second precision greater than the first precision.

36 Claims, 3 Drawing Sheets

(56) References Cited

OTHER PUBLICATIONS

"Root Finding and Nonlinear Sets of Equations", World Wide Web sample page from Numerical Recipes in C: The Art of Scientific Computing (ISBN 0-521-43108-5), Chapter 9.4, pp. 362-369.

"Root Finding and Nonlinear Sets of Equations", Sample page from Numerical Recipes in Fortran 77: The Art of Scientific Computing (ISBN 0-521-43064-X), Chapter 9.6, pp. 372-376.

European Search Report for European Application No: 09368054, European Patent Office, The Haughe, Sep. 17, 2010, pp. 2.

* cited by examiner

METHOD AND SYSTEM FOR CONTROLLING ELECTRICAL MACHINES

PRIORITY CLAIM

The instant application claims priority to European Patent Application No. EP09368054.4, filed Dec. 30, 2009, which application is incorporated herein by reference in its entirety.

TECHNICAL FIELD

An embodiment relates to the field of control systems of electrical machines, such as motors; more specifically an embodiment relates to a method and a related system for implementing the square-root-extraction operation.

BACKGROUND

An non-limitative example of a typical application of an embodiment is represented by so-called Field Orientated Control (FOC) systems, that are control systems dedicated to controlling three-phase electric motors.

A typical FOC control system operates starting from the measure of a plurality of currents in the stators of an electric motor, by dividing them into two separate components, one component being called the torque current and a second component being called the flow current. These currents are subjected to processing, within the FOC feedback loop, to drive said electric motor, according to the application.

As known, FOC control systems provide, for the control algorithm execution, square-root-extraction operations of decimal radicand with values comprised between 0 and 1, representative of electrical quantities, such as currents or voltages, with a high precision.

Therefore, it may be important to implement, in said control systems, an efficient function to compute this square root.

There are several known methods for extracting a square root, in particular fixed-point algorithms appear to run faster than floating-point ones. Among said algorithms for the fixed-point square-root extraction, the best known are the following three. One algorithm, called Newton's iterative algorithm, based on the homonymous mathematical method, provides a 32 bits precision and is capable of operating with decimal radicands, but it is very slow, even referring to the version limited to only ten iterations. A second algorithm, called the Turkowski algorithm, is based on the binary-restoring square-root extraction method, with linear type convergence, has a 32 bits result accuracy, and is also capable of processing decimal numbers and typically requires a lower execution time than the previous algorithm, but the execution time is still long compared to response times often necessary to ensure optimal performances in modern control systems. A third algorithm, known as Dijkstra's algorithm, is much faster, but only implements integer-numbers root extraction and provides an accuracy limited to 16 bits, which is insufficient for the standards required by many control systems.

SUMMARY

An embodiment is a method, and related system that overcomes the limitations inherent to the previously presented algorithms, which can ensure 32 bits precision, which has a computational speed comparable with the Dijkstra's algorithm, and which can process decimal type radicands.

An embodiment is a method for controlling an electrical machine, comprising:

detecting the value of at least one electrical quantity characterizing the machine operation;
processing said at least one electrical quantity value;
controlling the operation of the machine on the basis of said processing.

In an embodiment, said processing the value of said at least one electrical quantity comprises calculating a square root of a radicand value related to said electrical quantity detected value.

In an embodiment, said calculating the square root comprises:

calculating an approximated value of said square root, said approximated value having a first precision;
calculating a corrective value to be combined with said approximated value;
combining said approximated value with the corrective value thereof to obtain said square root value with a second precision greater than the first precision.

Another embodiment relates to an electrical machine control system comprising means for computing a square root of a radicand value expressing a value related to the electrical quantity detected value, said means being configured to implement the method according to an embodiment.

BRIEF DESCRIPTION OF THE DRAWINGS

Features and advantages of an embodiment will be better understood with reference to the following non-limiting detailed description, provided for illustrative and not restrictive purposes, to be read in conjunction with the attached figures. In this regard, it is expressly intended that the figures are not necessarily to scale and that, unless specified otherwise, they simply aim to conceptually illustrate the structures and procedures. In particular.

DETAILED DESCRIPTION

Figure 1:
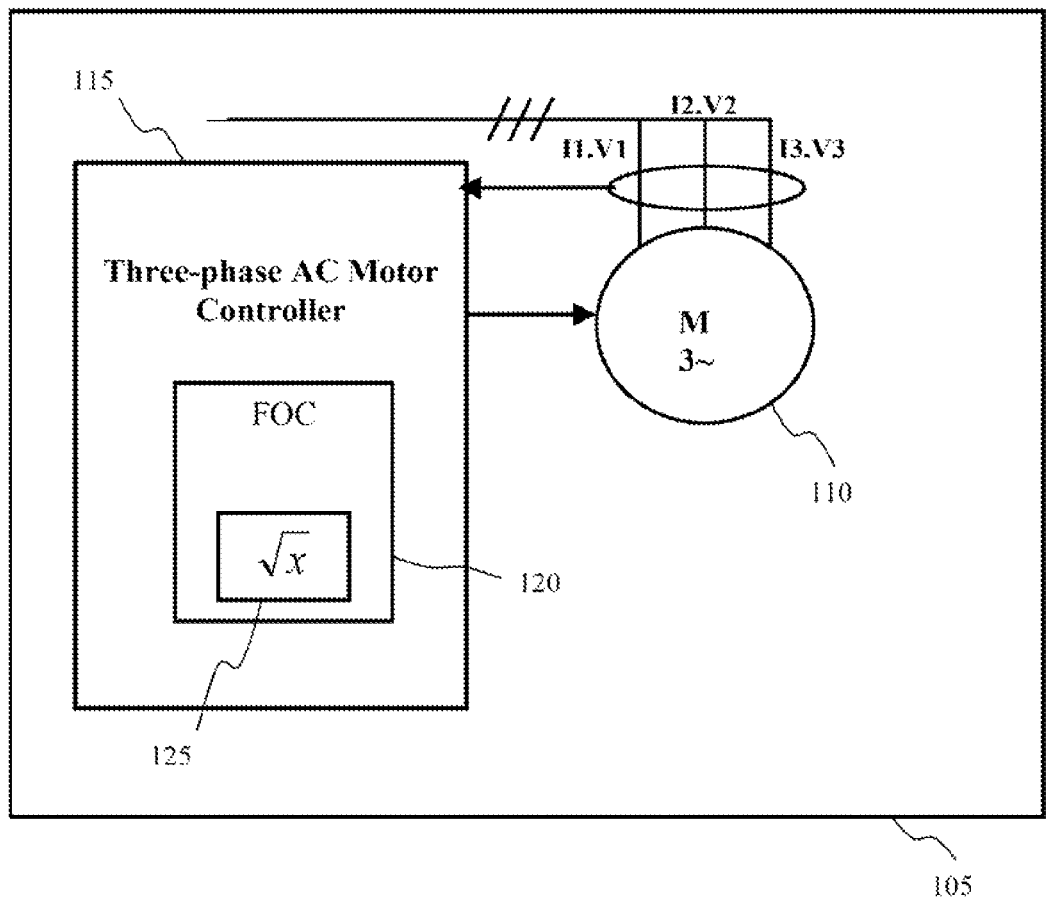
FIG. 1 is a schematic representation of an application scenario of an embodiment.

With reference to the drawings, FIG. 1 shows an application scenario for an embodiment. In particular, the considered example refers to a system 105, for example a machine tool, in which the movement of mechanical parts is actuated by an electric motor, particularly a three-phase motor 110, controlled by an electronic controller 115, in which there is implemented the Field Orientated Control (FOC) system 120 that by measuring and processing electrical quantities such as currents and voltages I1, V1, I2, V2, I3 and V3 supplied to the engine 110 performs a control on the electric motor, for example to adjust the rotation speed and torque. The FOC system 120 implements in particular a root extraction function 125.

Figure 2:
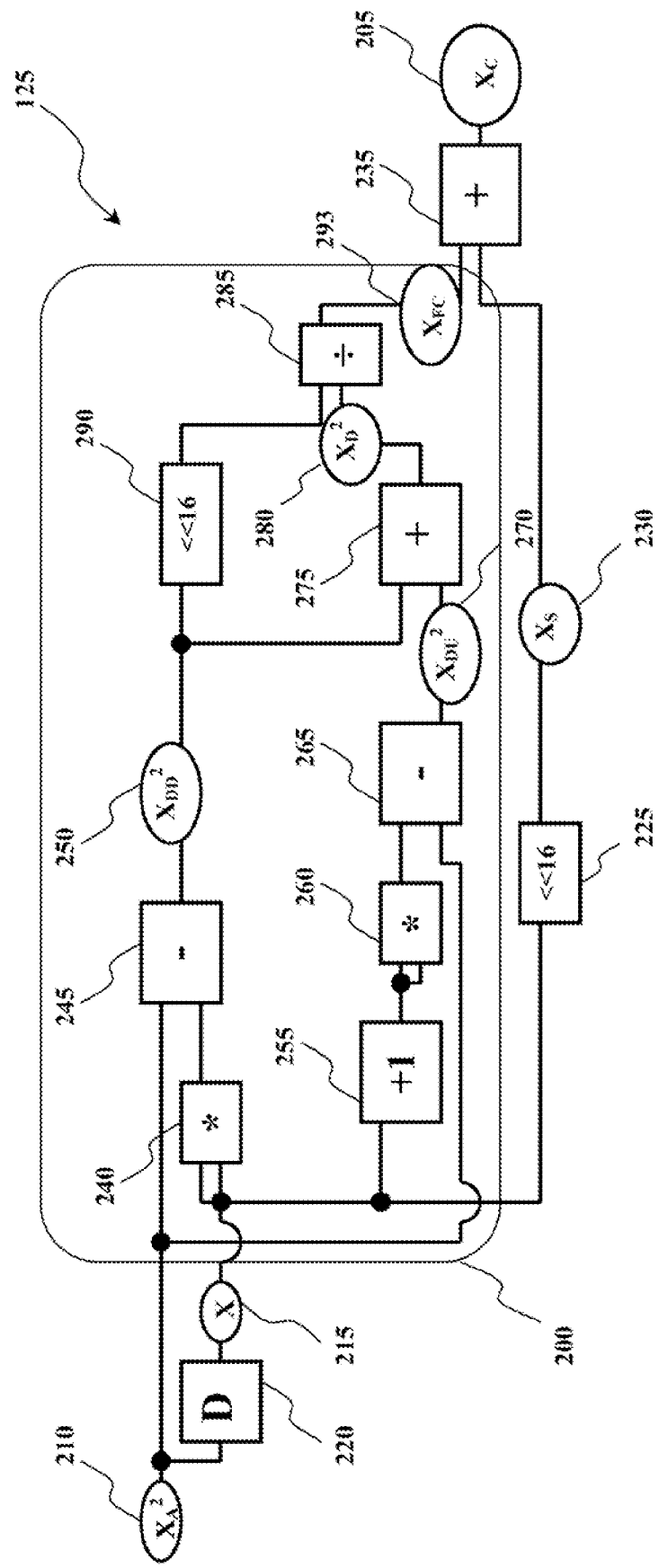
FIG. 2 is a representation in functional blocks terms of the main operations of a method according to an embodiment.

The functional block diagram depicted in FIG. 2 shows the main steps of a method according to an embodiment for implementing the square root extraction function 125.

The method according to an embodiment allows calculating the value of the square root (radical) $X_C$ 205, with 32 bits of precision, of an input value (root) $X_A^2$ 210, in particular a value between 0 and 1 (where the value 1 is a bound out of the range of the acceptable values), representing an electrical quantity (e.g. a voltage or a current), derived from the value of the detected electrical quantity. In particular, the radical $X_C$ 205 is calculated by firstly computing a 16 bits radical X 215

(thus, with limited accuracy) of the radicand $X_A^2$ 210, using the Dijkstra algorithm (schematized by block 220), or a similar algorithm. The radical X 215 calculated using the Dijkstra's algorithm 220, is then subjected to a correction to improve its accuracy to 32 bits; the calculation of the correction to be made is based on both the value of the radical X 215 and radicand $X_A^2$ 210.

In particular, the radical X 215 is subjected to a shift operation 225 of sixteen positions to the left in order to obtain a 32 bits number $X_S$ 230 that differs from the value of the corrected radical $X_C$ 205 for only the 16 least significant bits. The 16 least significant bits value of the corrected radical $X_C$ 205 are determined by the operations described below and added (block 235) to the $X_S$ 230 value, so as to obtain the radical $X_C$ 205.

In order to determine the 16 least significant bits value of the radical $X_C$ 205, the value X 215 calculated using the Djikstra algorithm is multiplied (block 240) by itself, so as to obtain a 32 bits number, representing the squared value of X 215, which is then subtracted (block 245) from the input radicand value $X_A^2$ 210, thereby obtaining a difference value $X_{DD}^2$ 250, which has only the 16 least significant bits different from zero. In parallel, the value of the radical X 215 is incremented by 1 (block 255). The value of X 215 incremented by 1 is then multiplied (block 260) by itself and the result thus obtained is subtracted (block 265) from the radicand value $X_A^2$ 210 in order to get a difference value $X_{DU}^2$ 270 also having only the 16 least significant bits different from zero. Subsequently, the values $X_{DD}^2$ 250 and $X_{DU}^2$ 270 are added together (block 275), thereby obtaining a value $X_D^2$ 280, with the 16 most significant bits equal to zero. The value $X_D^2$ 280 is used as the denominator in a division operation (block 285) in which at the numerator there is placed the value $X_{DD}^2$ 250, shifted (block 290) by 16 positions to the left. The value $X_{FC}$ 293 obtained by the division 285 provides the 16 least significant bits of the radical $X_C$ 205 and is added (block 235) to the value $X_S$ 230, thereby generating the radical $X_C$ 205.

The functional block schematic shown in FIG. 3 represents, again in terms of functional blocks, the main operations of a method, according to an embodiment, for implementing the square-root-extraction function 125 of a value between zero and one (wherein the value 1 is a bound out of the acceptable range of values), optimized for a practical implementation either in terms of hardware, or firmware/software, or a combination of both.

The value of the radical X 215 calculated using the Dijkstra algorithm (block 220) is shifted (block 225) by 16 bits to the left in order to obtain a 32 bits number $X_S$ 230 that differs from the corrected radical $X_C$ 205 only for the 16 least significant bits, and added (block 335) to obtain the value of the corrected radical $X_C$ 205, in a manner similar to that described above with reference to FIG. 2.

To calculate the value $X_D^2$ 362 (corresponding to the value indicated by the reference 280 in FIG. 2), the following mathematical development is exploited:

$$X_D^2 = X_{DU}^2 + X_{DD}^2 = (X+1)^2 - X_A^2 + X_A^2 - X^2 = (X+1)^2 - X^2 = 2X+1.$$

as will be observed, in this way it is possible to reduce the computational complexity.

In fact, from the formula shown above it is possible to understand that there is no need to calculate the value of $X_{DU}^2$ (indicated by reference 270 in FIG. 2) to obtain the corrected radical. This translates into a reduction of the operations to be performed and in a decrease in the complexity of the embodiment of FIG. 2. Therefore, a denominator $X_D^2$ 362 (corresponding to the denominator value indicated by reference 280 in FIG. 2) of the division 285 by which the correction value $X_F$ 342 is obtained is determined by multiplying (block 345) the value of the 16 bits radical X 215 for a constant 350 with a value equal to 2, thereby obtaining the value 2×, and a further constant 360 with a value equal to 1 is added to the multiplication result (block 355), thus obtaining the value 2 X+1. The numerator in the division operation 285 is determined by a similar procedure as described in relation to FIG. 2: the squared value of the 16 bits radical X 215 is calculated, obtained via the Dijkstra algorithm (block 320), by multiplying (block 240) the value of the radical X 215 by itself, thus obtaining a 32 bits number that is subtracted (block 245) from the 32 bits radicand value $X_A^2$ 210, thereby obtaining a difference value $X_{DD}^2$ 250, with only the 16 least significant bits different from zero. The difference value $X_{DD}^2$ 250 is then shifted (block 290) to the left by sixteen positions, and the shifted value thus obtained is used as the numerator in the division operation 285 which determines the corrected value $X_F$ 342, which will be added (block 335) to the shifted value $X_S$ 230.

It is noted that the value $X_D^2$ 362 is representable by a number with only the 16 least significant bits different from zero only if the value of the radical X 215 is a number lower than a constant equal to $2^{15}$, or if the bit in the sixteenth position (defined Most Significant Bit or MSB) is zero; otherwise, as a result of the multiplication operation (block 345) by the constant 2 350, an overflow occurs (that is, the largest representable number with a given sequence of bits is exceeded), generating a calculation error.

To avoid this, according to an embodiment of the present disclosure, a control path is provided that performs a comparison, through a comparator (schematized by block 385), of the radical value X 215 with a constant 387 with value $2^{15}$, that is the bound value for which the overflow condition does not take place. The result of this comparison controls a selector (block 390) that determines the second term of the addition, i.e. the value $X_{FC}$ 397, of the addition 335 between the correction factors $X_O$ 392 and $X_F$ 342, to determine the corrected radical $X_C$ 205. In particular, in the critical case in which the radical value X 215 is greater than $2^{15}$, to avoid the overflow condition the selector 390 selects as a correction value an approximated value $X_O$ 392, obtained from the ratio (block 395) between the difference value $X_{DD}^2$ 250 shifted (block 399) by fifteen positions to the left and the radical value X 215.

Said approximated value $X_O$ 392 is obtained in a simplified way by observing that for large values of the radical X 215, and particularly when the radical X 215 value is higher than $2^{15}$, the value 2 X is much greater than 1, so it is possible to approximate the value 2 X+1 with the value 2×. It is then possible to calculate the approximated value $X_O$ 392 by dividing the difference value $X_{DD}^2$ 250 shifted to the left by 15 positions (block 399), so as to obtain a value equal to half the difference value $X_{DD}^2$ 250 shifted to the left by 16 positions, by the value of the radical X 215. This will accelerate the roots-extraction calculation, reducing the number of operations performed in the overflow critical case.

Figure 3:
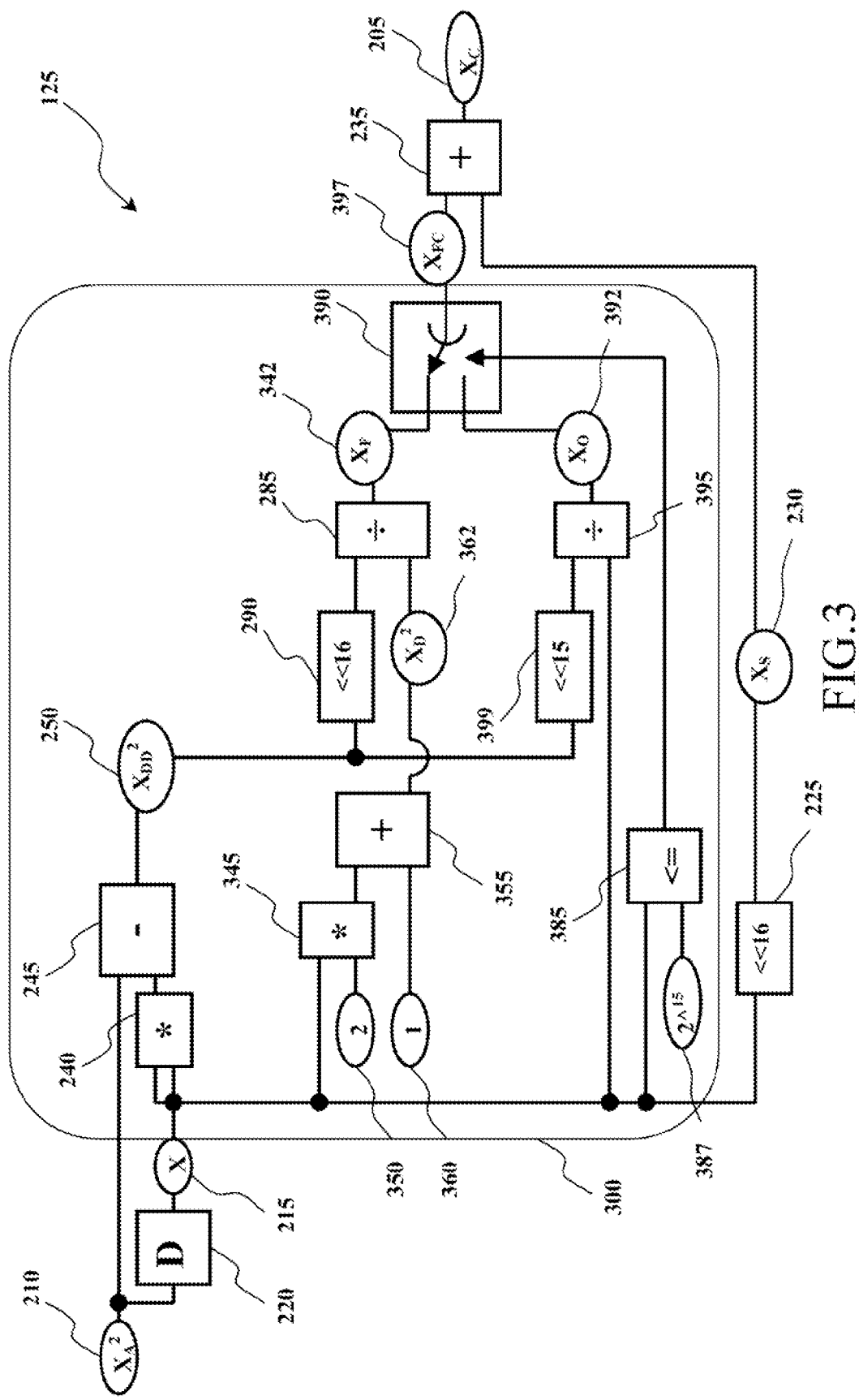
FIG. 3 is a schematic of an embodiment in functional-block terms more detailed than in FIG. 2.

If instead from the comparison 385 it results that the value of the radical X 215 is lower than its overflow value equal to the constant $2^{15}$ 387, the selector 390 selects as the correction value the value $X_F$ 342, calculated as previously described. The operations sequence described by the functional blocks diagram represented in FIG. 3 is summarized in a non limiting way, through the following formulas:

$$X_{FC} = (X << 16) + \frac{(X_{DD}^2 << 16)}{2X+1} \text{ for } X < 2^{15}$$

$$X_{FC} = (X << 16) + \frac{(X_{DD}^2 << 15)}{X} \text{ for } X > 2^{15}.$$

The following table shows the values obtained through simulations and tests, in order to provide a comparison between the known algorithms mentioned in the introduction of this description and an embodiment described here by way of example.

| Algorithm | CPU clock cycles [max] | Execution time [us] (f = 80 MHz) | Maximum error (for x^2 <= 0.2) Absolute | Precision [bit] | Regime error (for x^2 > 0.2) Absolute | Precision [bit] |
|---|---|---|---|---|---|---|
| Dijkstra | 67 | 0.8375 | 1.526E−05 | 16 | 1.526E−05 | 16 |
| Embodiment | 93 | 1.1625 | 3.781E−06 | 18 | 2.328E−10 | 32 |
| Turkowski | 440 | 5.5000 | 9.580E−04 | 10 | 2.328E−10 | 32 |
| Newton (10 iterations) | 3464 | 43.3000 | 3.429E−06 | 18 | 2.328E−10 | 3215 |

The algorithm according to an embodiment allows achieving an accuracy approximately identical to that obtainable with the Newton algorithm, i.e. the algorithm with higher accuracy among the known algorithms considered for comparison, in case of input values both greater and lower than 0.2; the value 0.2 identifies a breakdown for the set of real numbers in two ranges: for radicands of value lower than 0.2, an embodiment's convergence to the exact value may be slower, and there may be, therefore, a lower precision than the maximum attainable one, while for radicands of value greater than 0.2, the convergence may be faster, and may allow reaching the algorithm's maximum possible precision. Analyzing the columns on the execution speed, one may observe that an embodiment provides the radical value in a time just 0.325 microseconds longer than the time required to provide the same result by the Dijkstra's algorithm, but with twice the precision of the latter algorithm.

From the foregoing it will be appreciated that, although specific embodiments have been described herein for purposes of illustration, various modifications may be made without deviating from the spirit and scope of the disclosure. Furthermore, where an alternative is disclosed for a particular embodiment, this alternative may also apply to other embodiments even if not specifically stated.

The invention claimed is:

1. A control circuit, comprising:
a calculator configured:
to receive a value of a feedback signal;
to calculate a resulting root of the value having a resulting precision in response to the value and in response to an initial root of the value having an initial precision, the resulting precision having a greater bit depth than the initial precision; and
to generate a control signal in response to the resulting root of the value.

2. The control circuit of claim 1, further configured to receive a voltage feedback signal.

3. The control circuit of claim 1, further configured to receive a current feedback signal.

4. The control circuit of claim 1 wherein the resulting root is of a same degree as the initial root.

5. The control circuit of claim 1 wherein the resulting and initial roots are of a second degree.

6. The control circuit of claim 1 wherein the resulting precision is greater than the initial precision.

7. The control circuit of claim 1 wherein:
the resulting precision is thirty two bits; and
the initial precision is sixteen bits.

8. The control circuit of claim 1, further configured to calculate the resulting root in response to a power of the initial root.

9. The control circuit of claim 1, further configured to calculate the resulting root in response to a difference between the value and a power of the initial root.

10. The control circuit of claim 1, further configured to calculate the resulting root in response to a difference between the value and a power of the initial root, the power equalling a degree of the initial root.

11. The control circuit of claim 1, further configured to calculate the resulting root in response to a sum of the initial root and unity.

12. The control circuit of claim 1, further configured to calculate the resulting root in response to a power of a sum of the initial root and unity.

13. The control circuit of claim 1, further configured to calculate the resulting root in response to a power of a sum of the initial root and unity, the power equal to a degree of the initial root.

14. The control circuit of claim 1, further configured to calculate the resulting root in response to a difference between the value and a power of a sum of the initial root and unity.

15. The control circuit of claim 1, further configured to calculate the resulting root having a most significant portion equal to the initial root.

16. The control circuit of claim 1, further configured:
to calculate a first difference between the value and a power of the initial root;
to calculate a second difference between the value and a power of a sum of the initial root and unity;
to calculate a sum of the first and second differences;
to shift the first difference;
to calculate a quotient of the shifted first difference divided by the sum;
to shift the initial root; and
to calculate the resulting root as a sum of the shifted initial root and the quotient.

17. The control circuit of claim 1, further configured to calculate the resulting root in response to a product of a constant and the initial root.

18. The control circuit of claim 1, further configured to calculate the resulting root in response to a sum of unity and a product of a constant and the initial root.

19. The control circuit of claim 1, further configured to calculate the resulting root in response to a sum of unity and twice the initial root.

20. A method, comprising:
operating an apparatus in response to a control signal;
generating an operational signal having a value in response to the apparatus;
determining a resulting root of the value having a resulting precision in response to the value and in response to an initial root of the value having an initial precision, the resulting precision having a greater bit depth than the initial precision;
generating the control signal in response to the resulting root of the value.

21. The method of claim 20 wherein the resulting and initial roots are of a second degree.

22. The method of claim 20 wherein the resulting precision is greater than the initial precision.

23. The method of claim 20 wherein the determining comprises determining the resulting root in response to a power of the initial root.

24. The method of claim 20 wherein the determining comprises determining the resulting root in response to a difference between the value and a power of the initial root.

25. The method of claim 20 wherein the determining comprises determining the resulting root in response to a difference between the value and a power of the initial root, the power equalling a degree of the initial root.

26. The method of claim 20 wherein the determining comprise determining the resulting root in response to a sum of the initial root and a constant.

27. The method of claim 20 wherein the determining comprises determining the resulting root in response to a power of a sum of the initial root and a constant.

28. The method of claim 20 wherein the determining comprises determining the resulting root in response to a power of a sum of the initial root and a constant, the power equal to a degree of the initial root.

29. The method of claim 20 wherein the determining comprises determining the resulting root in response to a difference between the value and a power of a sum of the initial root and a constant.

30. The method of claim 20 wherein the determining comprises determining the resulting root having most significant bits equal to the initial root.

31. The method of claim 20 wherein the determining comprises determining the resulting root in response to a product of a constant and the initial root.

32. The method of claim 20 wherein the determining comprises determining the resulting root in response to a sum of a constant and a product of a constant and the initial root.

33. The method of claim 20 wherein the determining comprises determining the resulting root in response to a sum of a constant and twice the initial root.

34. A tangible non-transitory computer-readable medium storing instructions that when executed are configured to cause a controller:
to determine a resulting root of a value of a received feedback signal in response to the value and in response to an initial root of the value, the resulting root having a resulting precision and the initial root having an initial precision the resulting precision having a greater bit depth than the initial precision; and
to generate, in response to the resulting root, a signal configured to control an operation of an apparatus.

35. The tangible computer-readable medium of claim 34 wherein the resulting precision is greater than the initial precision.

36. The tangible computer-readable medium of claim 34 wherein the resulting precision is double the initial precision.

* * * * *